United States Patent [19]

Nagy et al.

[11] Patent Number: 5,370,942

[45] Date of Patent: Dec. 6, 1994

[54] WELDING AUXILIARY MATERIAL

[75] Inventors: János Nagy; Gyula Busai, both of Budapest, Hungary

[73] Assignee: Tungsram Reszvenytarsasag, Hungary

[21] Appl. No.: 818,119

[22] Filed: Jan. 8, 1992

[30] Foreign Application Priority Data

Jan. 15, 1991 [HU] Hungary .................. 101/91

[51] Int. Cl.$^5$ .................................................. B32B 5/18
[52] U.S. Cl. .................................... 428/550; 428/553; 428/569; 148/423; 219/146.31
[58] Field of Search ............... 428/550, 551, 553, 559, 428/560, 568, 569; 148/423; 219/146.31

[56] References Cited

U.S. PATENT DOCUMENTS

| 260,014 | 6/1882 | Fraley | 75/253 |
|---|---|---|---|
| 1,633,258 | 6/1927 | Laise | 428/568 |
| 2,640,135 | 5/1953 | Cobine | 219/8 |
| 2,830,169 | 4/1958 | Medicus | 219/92 |
| 3,113,202 | 12/1963 | Nollen et al. | 219/117 |
| 3,292,255 | 12/1966 | Marshall et al. | 29/494 |
| 3,819,364 | 6/1974 | Frehn | 75/122 |
| 3,848,151 | 11/1974 | McVey | 313/217 |
| 4,310,603 | 1/1982 | Falce | 428/596 |
| 4,426,428 | 1/1984 | Kammer et al. | 428/561 |
| 4,823,048 | 4/1989 | Ooms | 313/623 |
| 5,089,455 | 2/1992 | Ketcham et al. | 501/104 |

FOREIGN PATENT DOCUMENTS

| 121744 | 5/1944 | Australia | 219/146.31 |
|---|---|---|---|
| 723235 | 7/1942 | Germany . | |
| 185198 | 4/1988 | Hungary . | |
| 100991 | 6/1983 | Japan . | |
| 996146 | 2/1983 | U.S.S.R. | 219/146.31 |
| 1017460 | 5/1983 | U.S.S.R. | 219/146.31 |
| 1148746 | 4/1985 | U.S.S.R. | 219/146.31 |
| 1255347 | 9/1986 | U.S.S.R. | 219/146.31 |

OTHER PUBLICATIONS

European Search Report, Aug. 3, 1993.
Hodgman, Charles D. Editor-in-Chief, *Handbook of Chemistry and Physics*, 1960, pp. 420–421 and 427.

Primary Examiner—Donald P. Walsh
Assistant Examiner—Chrisman D. Carroll
Attorney, Agent, or Firm—Wigman, Cohen, Leitner & Myers

[57] ABSTRACT

An improved welding auxiliary material for producing welded joints between refractory metal parts of high-wattage electric light sources is described. The characteristic feature of the invention is that the welding auxiliary material has a porous structure surface layer sintered from a refractory metal powder having a melting point of above 2000° C.

5 Claims, 1 Drawing Sheet

WELDING AUXILIARY MATERIAL

BACKGROUND OF THE INVENTION

1. Field of the Invention

The invention relates to a welding auxiliary material for welding refractory metal parts of high-intensity electric light sources.

2. Description of the Prior Art

When manufacturing halogen lamps, the joints between the refractory metal parts such as tungsten or molybdenum are welded joints, as the reliability of the joints is an indispensable requirement.

Refractory metal parts of low-wattage halogen lamps with "standard", i.e. not long or extended life, are welded directly together, if no special requirement exists. This, however, does not ensure a satisfactory joint in every case. The Hungarian Patent No. 185.198 discloses a molybdenum lead-in foil for elimination of unsatisfactory features. The surface of the foil is provided with a thin electroplated rhenium layer. Such a lead-in foil has better weldability properties than the simple uncoated foil. A foil prepared in that way is useful in the manufacture of halogen lamps with low current loads and "standard" lives, for joining refractory metal parts and meets the requirements for reliable operation on that field, but not in the case of halogen lamps with extended or long lives and heavy current loads.

This is explained by the fact that only a low-thickness rhenium layer can be applied to the surface of the lead-in foil. This has the consequence that, during the welding operation, the lead-in wire is unable to get embedded into the thin rhenium layer applied to the lead-in foil and therefore, a small-surface weld will be produced. In case of high-wattage halogen lamps, the current flow - due to the high current density-generates a substantial amount of thermal load resulting in the earlier destruction of the joint and in shortened lamp life.

The functionability of halogen lamps with high current loads and lives of several thousand hours can only be insured if higher requirements for joining the refractory metal parts and for the bond produced in welding are met.

In some types of lamps with high current loads as well as long lives, a separate platinum welding auxiliary is placed between the basic metal foil and the current lead-in order to produce a welded joint of satisfactory quality.

In this case, platinum will melt during welding and form a molybdenum-platinum alloy phase with a portion of the molybdenum material of the foil. This adversely affects the strength at high temperatures of the molybdenum foil which can result in thickness decrease, cracks and tear in the foil.

Another disadvantage is that after melting at the temperature necessary for pinch-sealing the lamp liquid and/or vapour phase platinum can enter the inner space of the lamp where, on reaching the tungsten filament, a lower-melting platinum-tungsten alloy will be formed. This has the possible consequences of local filament fusing and arcing that result in early lamp failure.

It should also be considered a disadvantage that the melt creeps on the current lead-in during welding with the consequence that no gas-tight seal will be achieved in some cases.

A further disadvantage is that the so-called "brazed joint" will in lamp operation, caused by the local thermal load, get alloyed gradually into the basic metals during the time of operation. Caused by this "loss" of the initial bond, the cross-section available for current conduction will decrease and the local thermal load will be enchanced resulting in a further "loss" and a rapid deterioration of the joint. It is also a common practice to use a platinum coated welding auxiliary material for welding refractory metal parts together. This method suffers from the disadvantages described earlier in the discussion of platinum welding auxiliary material.

According to the U.S. Pat. No. 4,823,048, a joint is produced by spot-welding the inner current lead-in and the metal foil together and a welding auxiliary material foil is connected, also by means of welding, to this joint. The filler foil increases the surface area available for current conduction thereby reduces current density. One end of the metal foil is connected to the large-surface portion of the metal foil opposite to the inner current lead-in and its other end, to the inner current lead-in.

The joint according to U.S. Pat. No. 4,823,048 has the disadvantages of being complicated to produce and also the inability to solve the problems described earlier related to the cross-section reduction or tear of the current lead-in foil.

OBJECTS AND SUMMARY OF THE INVENTION

The object of the present invention is therefore to provide welding auxiliary material enabling to join the inner and outer current lead-in of high-wattage electric light sources with the current lead-in foil in a simple and rapid and reliable manner, without damage to the parts during welding and the subsequent pinch-sealing process.

Another object is to provide reliability for the joint even in the case of heavy current conduction properties over the time of operation.

Other objects and advantages of the present invention will become apparent from the description and drawings which will follow.

It has been found that a welding auxiliary material of unique structure and suitable thickness can be prepared by sintering refractory metal powder. Accordingly, the welding auxiliary material for producing welded joints between the refractory metal parts of high-wattage electric light sources is formed with a porous-structure surface layer sintered from a refractory metal powder having a melting point of above 2000° C.

The welding auxiliary material according to the invention can be further characterized by that the material of the refractory metal powder is molybdenum and/or rhenium.

In a preferred embodiment, the surface layer is sintered on a refractory metal substrate which substrate is a molybdenum foil.

In another embodiment, the surface layer pores are impregnated with and additive that promotes welding. In a preferred embodiment, ethanol or other alcohol derivative is used for the additive.

The welding auxiliary material has several favourable properties. Due to the porous-structure surface layer, the outer surface of the welding auxiliary material is rough including the side facing the molybdenum current lead-in foil.

During the welding operation, the relatively rough surface will make many point-like contacts with a high contact resistance and, caused by the intensive local heat generation, the welding auxiliary material will melt producing microweld spots and resulting in a large-surface welded zone.

Due to the intensive local heat generation, the time needed for welding can be shortened and this has the consequence that no recrystallization process will occur in the parts preventing the current lead-in parts from becoming brittle.

It should also be considered an advantage that the method of sintering, according to this invention forms a thicker surface layer and the current lead-ins will get embedded deeper into this thicker surface layer which increases the cross-section available for conduction. The increased cross-section results in improved current conduction properties and lower specific heat load and this leads to the prolongation of life.

It is also a significant advantage of the present invention that—due to the thicker surface layer—the material surrounding the weld neither will become overly thin nor will be distorted since the welding auxiliary material is thick enough to have satisfactory amount of material for producing the joint.

The strength properties at high temperatures of the rhenium-molybdenum and rhenium-tungsten alloys formed by welding when the rhenium-containing welding auxiliary material is used are more favourable than those of the component metals and these alloys melt high above the temperature used during the pinch-sealing process. Due to this fact, the undesired effects which are unavoidable when a platinium metal sheet is used, will not occur.

When the welding auxiliary material according to the invention is used, the alloy phase does not creep on the current lead-ins and does not melt during pinch-sealing. This results in a gas-tight seal that can be produced more safely than in the case of other known methods.

A further advantage of the welding auxiliary material according to the invention is that the pores can be filled with an additive promoting the welding process and, due to this, the welding auxiliary material is able by itself to provide a protective atmosphere during welding. This solution not only improves the quality of the welded joint, but also reduces the expenses for the welding operation by making unnecessary some machine accessories that have been indispensable so far.

BRIEF DESCRIPTION OF THE DRAWINGS

In the following, a more detailed description of the invention will be given by means of examples illustrated by drawing figures. In the drawings.

DETAILED DESCRIPTION OF THE PREFERRED EMBODIMENTS

Figure 1:
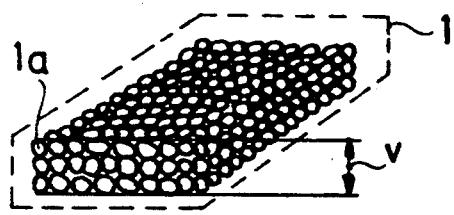
FIG. 1 is a perspective view of a preferred embodiment of the welding auxiliary material according to the invention.

In FIG. 1, an embodiment of the welding auxiliary material is shown, the entire cross-section of which is prepared from molybdenum metal powder using sintering. The welding auxiliary material 1, also including its surface layer 1a has a porous structure and consists of molybdenum grains ground to grain sizes below 10 microns. Thickness "v" of the welding auxiliary material 1 is 50 microns in this example, but it may vary depending on the field of application.

Figure 2:
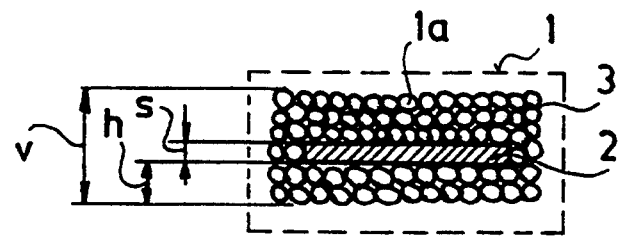
FIG. 2 is the cross-section of another preferred embodiment.

In FIG. 2, the cross-section of an embodiment is seen in which the surface layer 1a of the welding auxiliary material 1 is sintered on the refractory, preferably molybdenum metal substrate 2 having a sheet thickness "s" of 20 microns. Use of the metal substrate 2 is recommended in order to facilitate the handling of the welding auxiliary material 1. Thickness "v" of the welding auxiliary material 1 is 60 microns in this embodiment from which one can calculate that the construction thickness "h" is preferable in respect of producing the welded joint, but the construction thickness "h" of the surface layer 1a may vary from 10 microns up to 50 microns.

The pores of the surface layer 1a of the welding auxiliary material 1 are filled with an additive 3 preferably consisting of ethanol, but other alcohol derivatives can also be used. The additive 3, evaporating by the heat generated during welding, forms a protective atmosphere further improving the quality of the weld.

In another embodiment, the surface layer 1a is prepared from the mixture of rhenium and molybdenum metal powders instead of molybdenum powder alone. The proportion of rhenium to molybdenum may range between rather different values as the properties of the joint produced are improved by a welding auxiliary material 1 with as low as 5 to 10% rhenium content.

To show an example, the preparation of the welding auxiliary material 1 is performed as follows. The molybdenum foil metal substrate 2 having a sheet thickness "s" of 20 microns is coated with a mixture of rhenium and molybdenum metal powders ground to 1 micron grain size and suspended in alcohol. The proportion of rhenium to molybdenum is 2:1 in the mixture. This is followed by the sintering process performed in hydrogen-flushed tungsten-tube furnace at 2200° C. for 5 minutes. After this, the welding auxiliary material 1 described above and having the surface layer 1a with porous structure is prepared.

Figure 3:
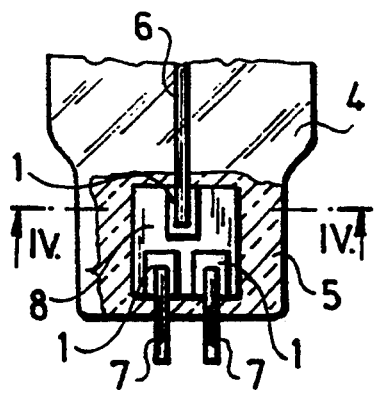
FIG. 3 is a view, partly in section, of the welded joint produced using the welding auxiliary material
Figure 4:
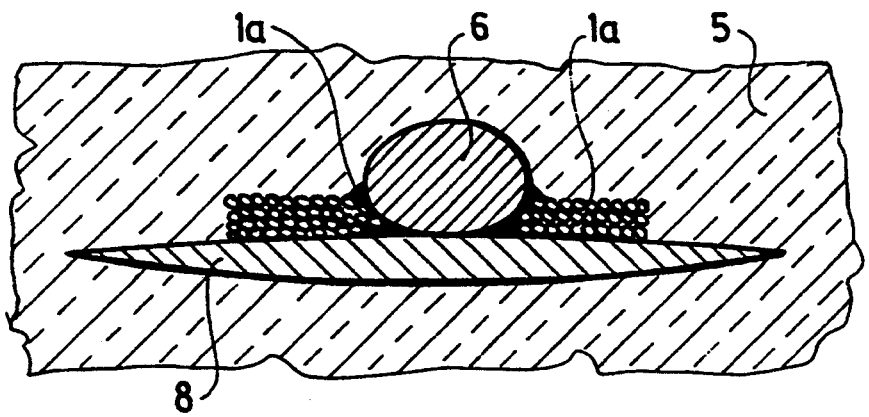
FIG. 4 is the sectional view taken along IV—IV of FIG. 3.

FIGS. 3 and 4 show an example for the use of the welding auxiliary material 1. Current lead-in foil 8 and outer current lead-in wires 7 and 7' welded to it as well as inner current lead-in 6 are placed in pinch-sealed portion 5 of bulb 4. The welding auxiliary material 1 being between the current lead-in foil 8 and the inner current lead-in 6 as well as between the current lead-in wires 7 and 7' and the current lead-in foil 8 is found only in the environment of the welded spot. The current lead-in foil 8 is made of molybdenum and the material of the inner current lead-in 6 is tungsten or molybdenum known and commonly used in light source manufacture.

It is seen clearly in FIG. 4 how the inner current lead-in 6 is connected to the current lead-in foil 8 fixed in the pinch-sealed portion 5.

The surface layer 1a molten caused by the effect of heat during welding surrounds the inner current lead-in 6 over a large surface and, due to this, the joint provides better conditions for current conduction than the known solutions do.

The welding auxiliary material 1 can be successfully used for welding together the parts located in pinch-sealed portions of electric light sources. Due to its favourable properties such as the resistance to reactive environments, it can also be used for joining parts inside the bulb of mercury and metal halide lamps.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. Welding auxiliary material for welding refractory metal parts of high-intensity electric light sources, comprising a molybdenum foil layer and a porous surface layer sintered from refractory metal powder and having a melting point above 2000 degrees centigrade, said refractory metal powder being a mixture of molybdenum and rhenium.

2. The welding auxiliary material according to claim 1, wherein the pores of the surface layer are impregnated with an additive that promotes welding.

3. The welding auxiliary material according to claim 2, wherein the additive is an alcohol or alcohol derivative thereof.

4. The welding auxiliary material according to claim 3, wherein the alcohol is ethanol.

5. The welding auxiliary material according to claim 1, wherein the ratio of rhenium to molybdenum ranges from 1:20 to 2:1.

* * * * *